US 8,571,275 B2

(12) United States Patent
Ryuto et al.

(10) Patent No.: US 8,571,275 B2
(45) Date of Patent: Oct. 29, 2013

(54) DEVICE AND METHOD FOR CREATING PHOTO ALBUM

(75) Inventors: Masayuki Ryuto, Minato-ku (JP); Kei Yamaji, Minato-ku (JP); Sakiko Narumi, Minato-ku (JP); Ryo Tabata, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/398,946

(22) Filed: Feb. 17, 2012

(65) Prior Publication Data

US 2012/0148121 A1 Jun. 14, 2012

Related U.S. Application Data

(62) Division of application No. 12/135,227, filed on Jun. 9, 2008, now Pat. No. 8,139,826.

(30) Foreign Application Priority Data

Jun. 8, 2007 (JP) .................................. 2007-153315

(51) Int. Cl.
*G06K 9/00* (2006.01)
(52) U.S. Cl.
USPC ............................ 382/118; 382/190; 382/296
(58) Field of Classification Search
USPC .......................................... 382/118, 190, 296
See application file for complete search history.

(56) References Cited

U.S. PATENT DOCUMENTS

| 7,675,647 | B2 | 3/2010 | Tsue et al. |
| 7,710,439 | B2 | 5/2010 | Reid et al. |
| 7,746,487 | B2 | 6/2010 | Tsue et al. |
| 7,773,782 | B2 | 8/2010 | Funakura |
| 2003/0174869 | A1 | 9/2003 | Suarez |

FOREIGN PATENT DOCUMENTS

| JP | 07-168872 A | 7/1995 |
| JP | 2000-270198 A | 9/2000 |
| JP | 2007-026246 A | 2/2007 |

*Primary Examiner* — John Strege
(74) *Attorney, Agent, or Firm* — Sughrue Mion, PLLC

(57) ABSTRACT

A device for automatically creating a photo album is disclosed. A face detection unit detects faces from an inputted image, an inclination determining unit determines an inclination of the inputted image based on inclinations of the faces, a temporary trimming reference area determining unit determines a trimming reference area containing one or more of the faces, a temporary trimming reference point determining unit determines a trimming reference point in the trimming reference area, an image rotating unit rotates the inputted image depending on the inclination of the inputted image, a trimming unit sets in the inputted image a layout frame of an image insertion area of a photo album template such that the layout reference point is positioned on the trimming reference point and the trimming reference area is contained within the layout frame and carries out trimming, and a template composition unit combines the trimmed area with the template.

9 Claims, 12 Drawing Sheets

DEVICE AND METHOD FOR CREATING PHOTO ALBUM

This application is a divisional of U.S. patent application Ser. No. 12/135,227, filed Jun. 9, 2008, which claims priority to JP Application No. 2007-153315, filed Jun. 8, 2007, each of which is incorporated herein by reference in its entirety.

BACKGROUND OF THE INVENTION

1. Field of the Invention

The present invention relates to a device and a method for creating a photo album by combining images with a template.

2. Description of the Related Art

There are software applications for consumer users and professional users (such as an operator working at a photo print shop) that achieve a function to implement, on a computer, a method to create a photo album, which involves applying image quality adjustment, edition and/or other processing, as necessary, on inputted image data obtained through photographing with a digital camera or by scanning a photographic film containing photographed images with a film scanner, and inserting processed images into a photo album template prepared in advance.

For example, a device for creating a photo album is known (see, for example, Japanese Unexamined Patent Publication No. 2007-026246). In this device, as the user selects a template for a photo album, selects an image to be placed in a layout frame of the selected template, and manually specifies a range of a main subject region in the selected image and a point of interest of the main subject, determination is made as to whether the main subject region fits in the layout frame. If it is determined that the main subject region fits in the layout frame, a trimming area is determined for the image so that the point of interest is positioned on a reference point set in advance in the layout frame, and then, the area is trimmed and the trimmed image is inserted in the layout frame to combine the image with the template.

The above described device requires the user to manually specify the main subject region and the point of interest, and these operations take time and trouble.

In the field of photo printing devices for photos of standard formats, such as ID photos, a device is known (see, for example, Japanese Unexamined Patent Publication No. 2000-270198) that extracts face contour information from a photographed image of a person, and the extracted face region is aligned with and scaled to a predetermined area (a layout frame) of a template selected by the user, to combine the extracted face region with the template and print out the composite image. According to this device, the image and the template can automatically be combined without requiring the user to manipulate the image to be combined.

The above device disclosed in Japanese Unexamined Patent Publication No. 2000-270198, however, handles only images with a front-oriented person's face having a fixed picture composition according to the purpose, such as ID photo, and this document does not describe or suggest a problem to be solved and means to solve the problem to automate the photo album creating method described in the above-identified Japanese Unexamined Patent Publication No. 2007-026246, or the like. In a case where a photo album is created, images to be combined with a template are not only those having fixed picture compositions, and includes images having various picture compositions with various vertical directions of the scenes and inclinations of the subjects. Further, the number of person contained in the image is not limited to one. Therefore, if such images are combined with a template using the above device disclosed in Japanese Unexamined Patent Publication No. 2000-270198, some images may be combined with the template with the subject therein being inclined, or the region of the image combined with the template may not contain all the subject persons in the image.

SUMMARY OF THE INVENTION

In view of the above-described circumstances, the present invention is directed to providing a device and a method for creating a photo album, which can create a photo album by automatically combining an image to be combined with a template in an appropriate manner, even if the image to be combined contains more than one persons and/or persons with various inclinations, without requiring manual operations by the user on the image to be combined.

A first aspect of the photo album creating device of the invention includes: a face detection unit to detect at least one person's face region from an inputted image; an inclination determining unit to calculate an inclination of each of the at least one person based on content characteristics of the person and to determine an inclination of the inputted image based on the calculated inclination; an image rotating unit to rotate the inputted image depending on the inclination of the inputted image; a trimming reference area determining unit to determine a trimming reference area in the rotated inputted image, the trimming reference area containing one or more of the at least one face region detected by the face detection unit; a trimming reference point determining unit to determine a trimming reference point in the trimming reference area; a template for the photo album associated with at least one image insertion area for receiving an inserted image, and a layout reference point arbitrarily set in each image insertion area, the template including at least one layout frame, each layout frame representing an outline of each image insertion area; a trimming unit to set in the inputted image one of the at least one layout frame and trim the inputted image along the set layout frame, wherein the layout frame is set such that the layout reference point is positioned on the trimming reference point and the trimming reference area is contained in the layout frame; and a template composition unit to combine an area of the trimmed inputted image with the template.

A first aspect of the photo album creating method of the invention includes: obtaining a template for the photo album associated with at least one image insertion area for receiving an inserted image, and a layout reference point arbitrarily set in each image insertion area, the template including at least one layout frame, each layout frame representing an outline of each image insertion area; detecting at least one person's face region from an inputted image; calculating an inclination of each of the at least one person based on content characteristics of the person and determining an inclination of the inputted image based on the calculated inclination; rotating the inputted image depending on the inclination of the inputted image; determining a trimming reference area in the rotated inputted image, the trimming reference area containing one or more of the at least one detected face region; determining a trimming reference point in the trimming reference area; setting, in the inputted image, one of the at least one layout frame and trimming the inputted image along the set layout frame, wherein the layout frame is set such that the layout reference point is positioned on the trimming reference point and the trimming reference area is contained in the layout frame; and combining an area of the trimmed inputted image with the template.

A second aspect of the photo album creating device of the invention includes: a face detection unit to detect at least one person's face region from an inputted image; an inclination determining unit to calculate an inclination of each of the at least one person based on content characteristics of the person and to determine an inclination of the inputted image based on the calculated inclination; a trimming reference area determining unit to determine a trimming reference area in the inputted image, the trimming reference area containing one or more of the at least one face region detected by the face detection unit; a trimming reference point determining unit to determine a trimming reference point in the trimming reference area; a template for the photo album associated with at least one image insertion area for receiving an inserted image, a layout reference point arbitrarily set in each image insertion area, and inclination information representing an inclination of an image supposed to be inserted into each image insertion area, the template including at least one layout frame, each layout frame representing an outline of each image insertion area; an image insertion area determining unit to compare the inclination of the inputted image determined by the inclination determining unit with the inclination information to determine, from the template, one of the at least one image insertion area corresponding to the inclination of the inputted image; a trimming unit to set in the inputted image the layout frame representing the outline of the determined image insertion area and trim the inputted image along the set layout frame, wherein the layout frame is set such that the layout reference point is positioned on the trimming reference point and the trimming reference area is contained in the layout frame; and a template composition unit to combine an area of the trimmed inputted image with the template.

A second aspect of the photo album creating method of the invention includes: obtaining a template for the photo album associated with at least one image insertion area for receiving an inserted image, a layout reference point arbitrarily set in each image insertion area, and inclination information representing an inclination of an image supposed to be inserted into each image insertion area, the template including at least one layout frame, each layout frame representing an outline of each image insertion area; detecting at least one person's face region from an inputted image; calculating an inclination of each of the at least one person based on content characteristics of the person and determining an inclination of the inputted image based on the calculated inclination; determining a trimming reference area in the inputted image, the trimming reference area containing one or more of the at least one detected face region; determining a trimming reference point in the trimming reference area; comparing the inclination of the inputted image with the inclination information to determine, from the template, one of the at least one image insertion area corresponding to the inclination of the inputted image; setting, in the inputted image, the layout frame representing the outline of the determined image insertion area and trimming the inputted image along the set layout frame, wherein the layout frame is set such that the layout reference point is positioned on the trimming reference point and the trimming reference area is contained in the layout frame; and combining an area of the trimmed inputted image with the template.

Next, details of the invention will be explained.

For detecting the face region in the inputted image, a method described, for example, in Japanese Unexamined Patent Publication No. 2000-270198, or any method known at the time of practicing the invention may be used.

During the face detection, a person's face of a main subject in the inputted image may be detected. The main subject may, for example, be a front-oriented person's face or a face region having a higher degree of probability of being the face (such as similarity to a template), which may be determined during the face detection.

For calculating the inclination of each person in the inputted image, a method described, for example, in Japanese Unexamined Patent Publication No. 8 (1996)-138024 or 2005-202477, or any method known at the time of practicing the invention may be used.

A specific example of a method usable for determining the inclination of the inputted image based on the inclinations of the respective persons in the inputted image may involve creating a histogram of the inclinations of the persons in the inputted image, and determining a central value of the most frequent class as the inclination of the inputted image.

A main subject may be determined from the persons detected by the face detection operation based on content characteristics of the persons, and the inclinations of the detected persons may be weighted such that a larger weight is assigned to the inclination of the main subject, to determine the inclination of the inputted image.

The rotation of the inputted image depending on the inclination of the inputted image may be achieved by rotating the inputted image by an angle equal to the angle representing the inclination, or by rotating the inputted image by an angle determined with an interval of 90 degrees.

The trimming reference area may have any shape as long as the area contains one or more of the detected face regions. For example, the trimming reference area may be a rectangular area. Further, the trimming reference area may be determined using a method described, for example, in Japanese Unexamined Patent Publication No. 2005-208732.

The trimming reference area may contain all the detected face regions, or may contain only the main subject, which may be determined based on the content characteristics of the persons detected by the face detection operation.

Further, a distance between the face regions adjacent to each other may be calculated, and if the calculated distance is larger than a predetermined threshold, more than one trimming reference areas having a boundary between the adjacent face regions may be determined.

It should be noted that the determination of the trimming reference area may be carried out after the inputted image has been rotated as described above, or an area containing one or more of the face regions detected from the inputted image may temporarily be determined in the inputted image before the rotation, and then the inputted image may be rotated and the temporarily determined area in the rotated inputted image may be used as the trimming reference area.

The trimming reference point and the layout reference point may be any point that can be specified by calculation with a computer from the information of the inputted image/image insertion area. Specific examples thereof may include a center point or a centroid of the trimming reference area/image insertion area. Further, the trimming reference point and the layout reference point may be specified by different methods.

When the layout frame is set in the inputted image based on the trimming reference area, the inputted image and the trimming reference area may be enlarged or reduced, as necessary.

In a case where the trimming reference area is a rectangular area and the template contains more than one image insertion areas, the trimming may be carried out when an aspect ratio of the layout frame and an aspect ratio of the trimming reference area are similar enough to each other to satisfy a predetermined criterion. Specifically, an image insertion area satisfying the criterion may be selected for each of more than one inputted images to carry out the trimming, or an inputted image satisfying the criterion may be selected for each image insertion area to carry out the trimming.

In contrast, when the aspect ratio of the layout frame and the aspect ratio of the trimming reference area are not similar enough to each other to satisfy a predetermined criterion, a main subject may be determined from the persons detected by the face detection operation based on content characteristics of the persons, and an area containing only the main subject may be used as the trimming reference area to carry out the trimming.

Alternatively, when the predetermined criterion is not satisfied, the trimming reference area may be divided into smaller areas, and the trimming may be carried out for each of the smaller areas with using the layout frames of the more than one image insertion areas on facing pages of the photo album.

DESCRIPTION OF THE PREFERRED EMBODIMENTS

Figure 1:
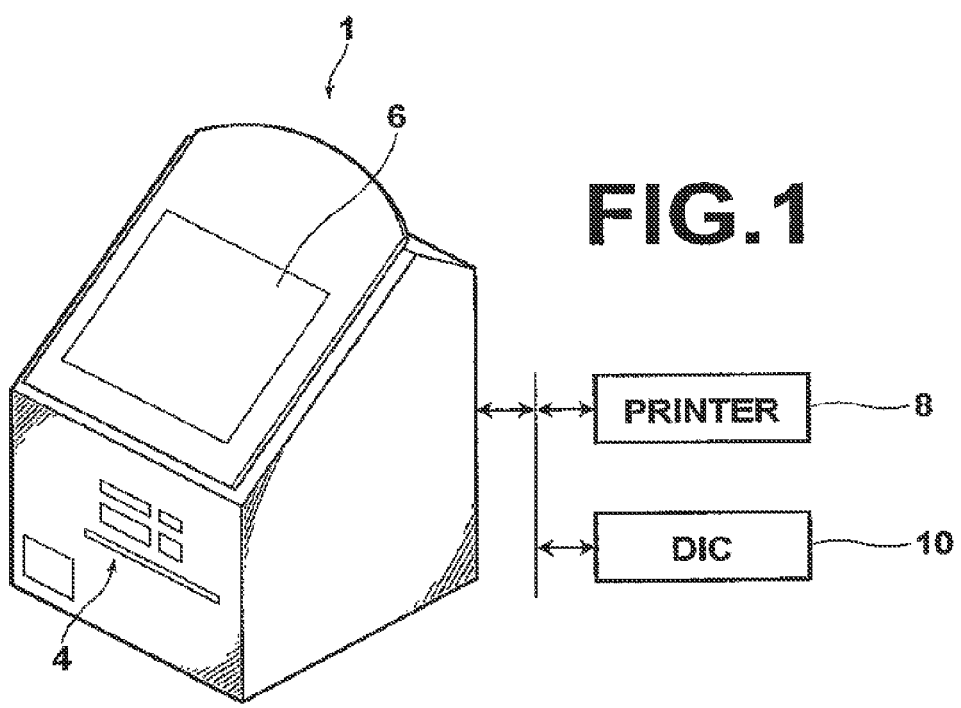
FIG. 1 is a perspective view illustrating the appearance of an order receiving device incorporating a photo album creating device according to embodiments of the present invention.

Hereinafter, embodiments of the present invention will be described with reference to the drawings. FIG. 1 is a perspective view showing the appearance of a photo print order receiving device incorporating a photo album creating device according to a first embodiment of the invention. The order receiving device 1 is to be installed at a photo print shop for receiving photo print orders from users. The order receiving device 1 includes: a card slot 4 of various types to receive a memory card of various types, which stores images to be printed, to read images recorded in the memory card or record images in the memory card; and a display unit 6 for displaying various screens for print order. The order receiving device 1 is connected, via a network, to a printer 8 installed at the photo print shop and a digital image controller (DIC) 10 for applying image processing to the images and managing the print orders. The display unit 6 is provided with a touch panel-type input unit, and the user can make necessary input for ordering print or organizing images by touching the display unit 6 according to instructions displayed on the display unit 6.

Figure 2:
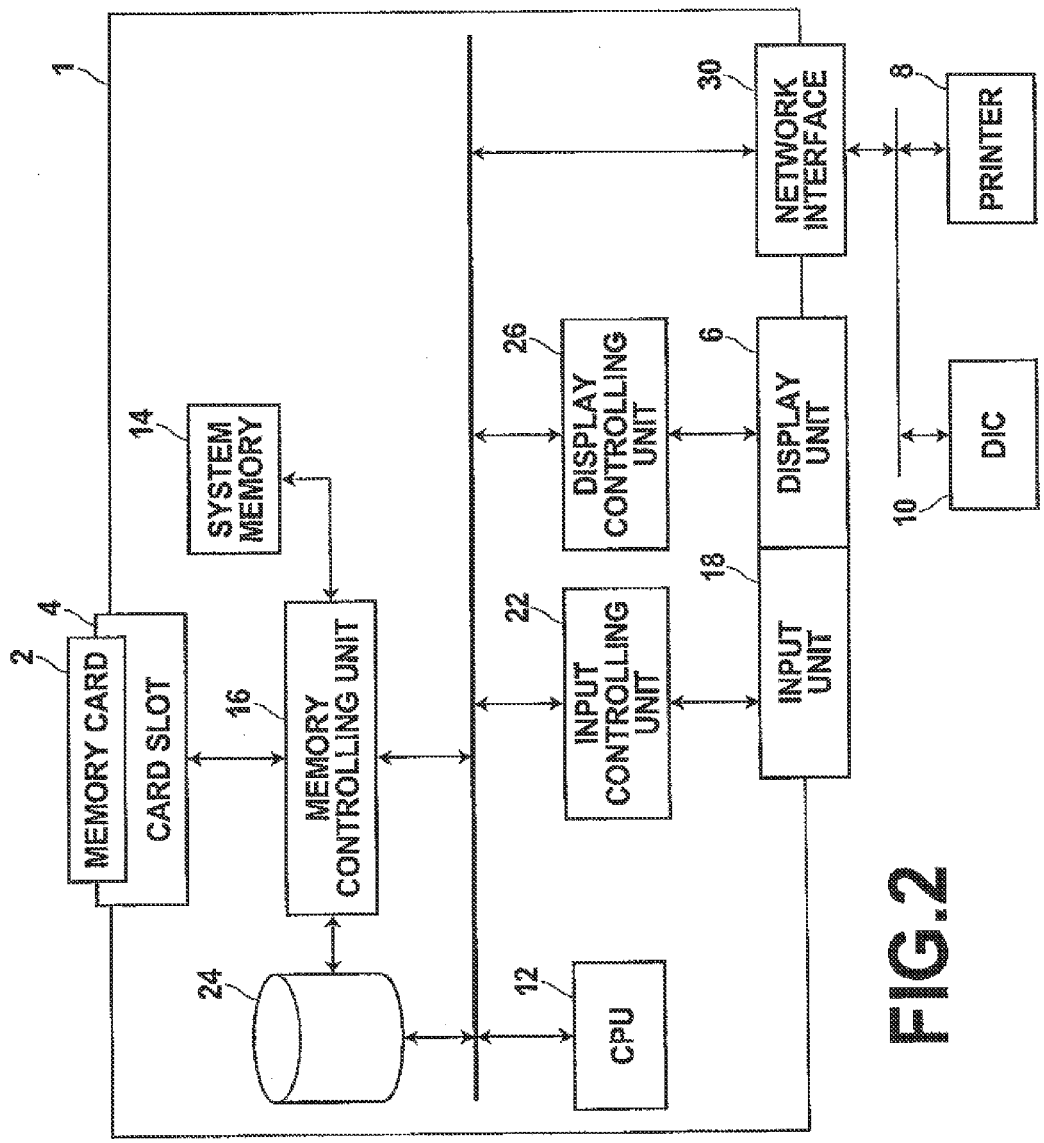
FIG. 2 is a schematic block diagram illustrating the configuration of the order receiving device according to the embodiments of the invention.

FIG. 2 is a schematic block diagram illustrating the configuration of the order receiving device 1. As shown in FIG. 2, the order receiving device 1 includes: a CPU 12 for exerting various controls, such as for controlling recording of image data representing images, for controlling display, and for controlling the respective units forming the device 1; a system memory 14 formed by a ROM that stores basic programs and various constants for operating the device 1 and a RAM that provides work area for various processing carried out by the CPU 12; the touch panel-type input unit 18 for allowing the user to input various instructions to the device 1; and the above-described display unit 6.

The order receiving device 1 further includes: the above-described card slot 4; a hard disk 24 for storing images read out from the memory card 2, various programs carried out by the CPU 12 for print order or image organization and reference data; a memory controlling unit 16 for controlling the system memory 14, the card slot 4 and the hard disk 24; a display controlling unit 26 for controlling display on the display unit 6; an input controlling unit 22 for controlling input through the input unit 18; and a network interface 30 for communication between the device 1 and the printer 8 and the DIC 10 via the network.

It should be noted that, although the single card slot 4 is shown in FIG. 2 for simplicity, the order receiving device 1 includes, in practice, multiple card slots 4 corresponding to various types of memory cards 2.

Processes carried out by the order receiving device 1, which will be described later, are implemented by execution of various programs stored in the hard disk 24. It should be noted that the various programs are stored in the hard disk 24 by installing the programs from a computer-readable recording medium storing the various programs, such as a CD-ROM. The various programs are formed by a main program that controls the overall process carried out in the order receiving device 1 and subprograms that are called, as necessary, by the main program to carry out a print ordering process or a photo album creating process.

Figure 3:
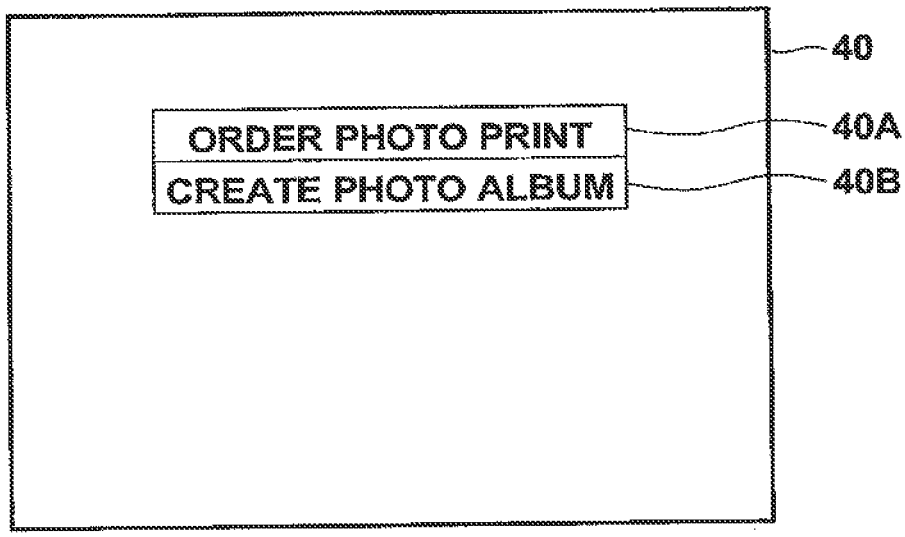
FIG. 3 illustrates an initial screen.

The print order via the order receiving device 1 is made as follows. FIG. 3 shows an initial screen to be displayed on the display unit 6 of the order receiving device 1. Display of this screen is controlled by the main program. As shown in FIG. 3, the initial screen 40 includes an "order photo print" button 40A for making a print order and a "create photo album" button 40B for carrying out the photo album creation process, which will be described later. In a case where the user has selected the "order photo print" button 40A, the main program calls a print order processing subprogram in the CPU 12, and operations according to this subprogram are carried out. As the user loads, following an instruction displayed on the screen, the memory card 2 storing a plurality of images in the card slot 4, the device 1 reads out the images from the memory card 2 and temporarily stores the images on the hard disk 24, and then displays a list of the images on the display unit 6.

The user selects images to be printed from the list of images displayed on the display unit 6, and sets the number and the size of each print via the touch panel-type input unit 18. As the user instructs execution of printing via the input unit 18, order information indicating the images selected by the user and the number and the size of each print is sent to the DIC 10. Then, image processing necessary for improving image quality is applied to the ordered images, and the images of the number and the size according to the order information are printed and outputted from the printer 8.

Next, the photo album creating device of the first embodiment of the invention will be described. The process carried out by the photo album creating device is implemented by execution of a photo album creation sub program, which is called by the main program when the user has selected the "create photo album" button 40B on the initial screen shown in FIG. 3. In this embodiment, a plurality of images inputted by the user are inserted in image insertion areas of a photo album template selected by the user in the order of photographing time and date.

Figure 4:
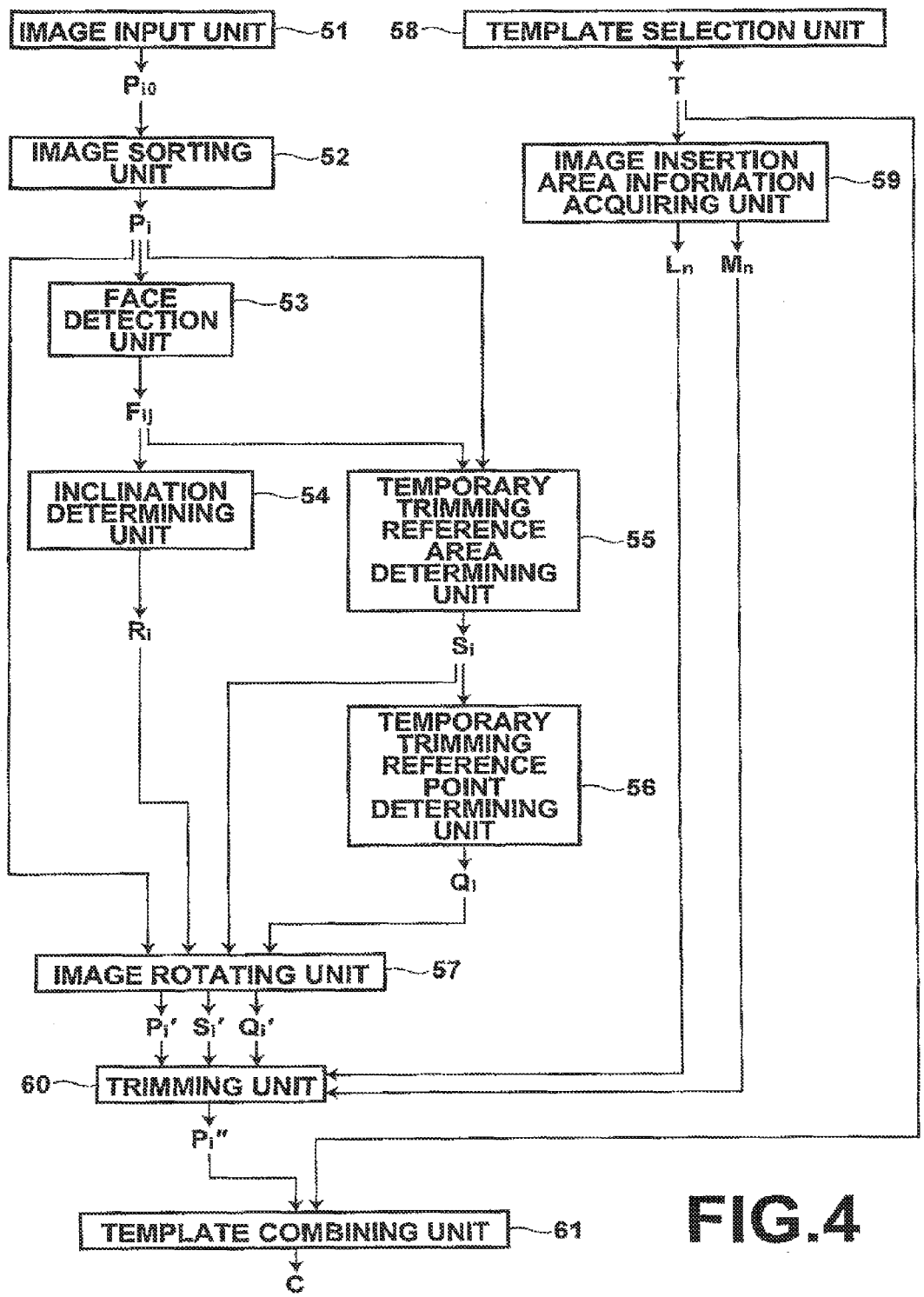
FIG. 4 is a block diagram schematically illustrating the configuration of and data flow in the photo album creating device according to a first embodiment of the invention.

FIG. 4 is a block diagram schematically illustrating the configuration of and data flow in the photo album creating device. As shown in the drawing, the photo album creating device includes an image input unit 51, an image sorting unit 52, a face detection unit 53, an inclination determining unit 54, a temporary trimming reference area determining unit 55, a temporary trimming reference point determining unit 56, an image rotating unit 57, a template selection unit 58, an image insertion area information acquiring unit 59, a trimming unit 60 and a template composition unit 61.

The image input unit 51 receives a plurality of images $P_{i0}$ ($i0=1, 2, \ldots, I$) inputted from the memory card 2 of the user. As the user loads the memory card 2 with these images recorded therein in the card slot 4, the inputted image receiving unit 51 reads out the images $P_{i0}$ ($i0=1, 2, \ldots, I$) from the memory card 2 and temporarily saves them on the hard disk 24. A user interface may be provided, which displays on the display unit 6 the images saved on the hard disk 24 to allow the user to select, via the input unit 18, images $P_{i0}$ ($i0=1, 2, \ldots, I$) to be contained in a photo album from the displayed images.

The image sorting unit 52 sorts the images $P_{i0}$ ($i0=1, 2, \ldots, I$) to be contained in the photo album in the order of photographing time and date, from the oldest. The photographing time and date is acquired from an Exit tag added to image data of each image $P_{i0}$ ($i0=1, 2, \ldots, I$). In the following description, the images sorted in the order of photographing time and date are referred to as images $P_i$ ($i=1, 2, \ldots, I$) in the order of photographing time and date.

The face detection unit 53 detects at least one face region $F_{ij}$ ($j=1, 2, \ldots$) in each inputted image $P_i$. Specifically, the face detection unit 53 detects a skin color region having a near-circular shape as the face region $F_{ij}$ based on contrast information of the image $P_i$. Alternatively, classifiers for classifying faces having various inclinations (vertical directions) obtained through a machine learning technique, such as Ada-Boost, may be used to detect the face region (see, for example, Japanese Unexamined Patent Publication No. 2005-250775).

Figure 6:
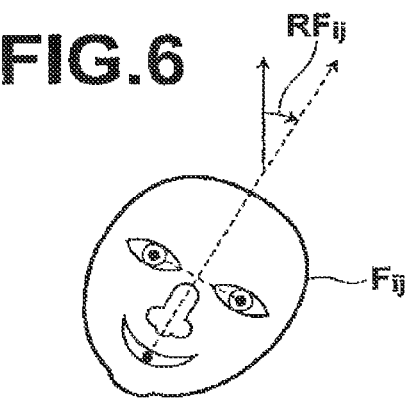
FIG. 6 is a diagram for explaining an inclination of a face region.

The inclination determining unit 54 calculates an inclination $RF_{ij}$ of each face region $F_{ij}$, and determines an inclination $R_i$ of the inputted image $P_i$ based on the calculated inclination $RF_{ij}$. FIG. 6 is a diagram for explaining how the inclination $RF_{ij}$ of the face region $F_{ij}$ is calculated. First, the inclination determining unit 54 detects regions of the eyes and the mouth from the face region $F_{ij}$, and finds an angle $RF_{ij}$ between a line which is drawn from the center of the mouth region and perpendicularly crosses a line connecting the centers of the eyes and a line drawn along the vertical direction of the image $P_i$. For detecting the regions of the eyes and the mouth from the face region $F_{ij}$, a method in which black regions in the face region $F_{ij}$ are detected as the eyes and a red region in the face region $F_{ij}$ is detected as the mouth (see, for example, Japanese Unexamined Patent Publication Nos. 8(1996)-138024 and 2005-202477), or a technique to detect the eyes and the mouth by using classifiers obtained through a machine learning technique, such as AdaBoost (see, for example, Japanese Unexamined Patent Publication No. 2006-164133) may be used. Then, the angle $RF_{ij}$ is converted into a rotational angle $RF_{ij}'$, which is determined with an interval of 90 degrees. For example, the conversion may be carried out as follows:

if 0 degree<$RF_{ij}$≤45 degrees, then $RF_{ij}'$=0 degree,
if 45 degrees<$RF_{ij}$≤135 degrees, then $RF_{ij}'$=90 degrees,
if 135 degrees<$RF_{ij}$≤225 degrees, then $RF_{ij}'$=180 degrees,
if 225 degrees<$RF_{ij}$≤315 degrees, then $RF_{ij}'$=270 degrees, and
if 315 degrees<$RF_{ij}$≤360 degrees, then $RF_{ij}'$=0 degree.

The inclination determining unit 54 further founds an inclination $RF_i$, which is the most frequent inclination of the face regions in the image, based on the rotational angle $RF_{ij}'$ of each face region $F_{ij}$ ($j=1, 2, \ldots$), and calculates the inclination $R_i$ of the inputted image $P_i$ according to equation (1) below:

$$R_i = RF_i \times (-1) + 360 \tag{1}$$

It should be noted that, if there are more than one most frequent inclinations $RF_i$, then $R_i$=0 degree.

Figure 7A:
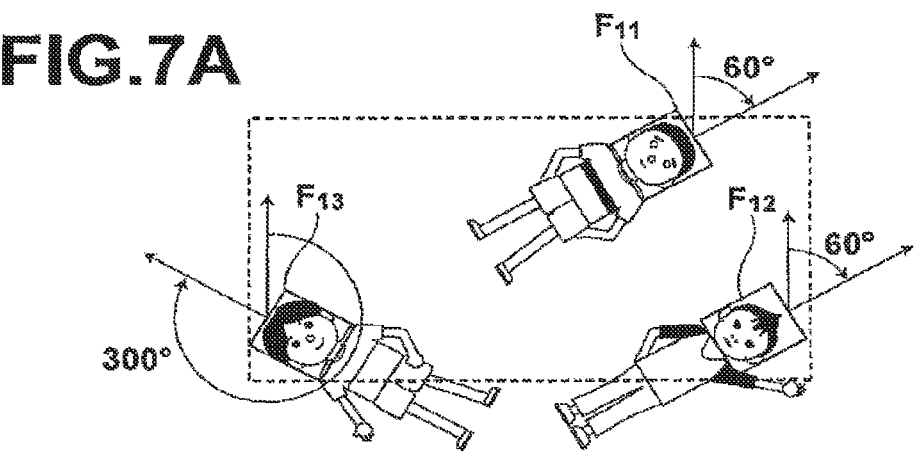
FIGS. 7A and 7B are diagrams for explaining how an inclination of an inputted image is determined from inclinations of face regions.
Figure 7B:
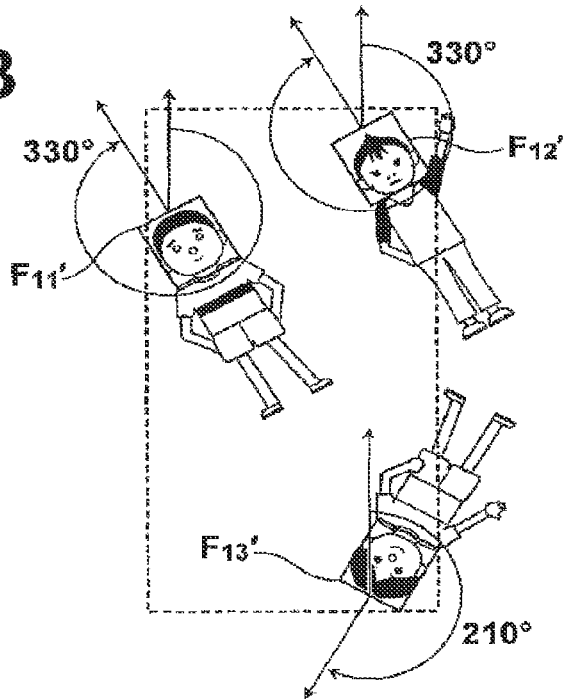

In the specific example shown in FIG. 7A, inclinations $RF_{11}$ and $RF_{12}$ of face regions $F_{11}$ and $F_{12}$ are respectively 60 degrees, and an inclination $RF_{13}$ of a face region $F_{13}$ is 300 degrees. Therefore, $RF_{11}'$=$RF_{12}'$=90 degrees, and $RF_{13}'$=270 degrees. Thus, the most frequent inclination $RF_i$ is 90 degrees, and the inclination $R_i$ is found to be 270 degrees according to the above equation (1). FIG. 7B shows the same image as that shown in FIG. 7A which is rotated clockwise by 270 degrees. As shown in the drawing, the vertical direction of the image is determined to correspond to the vertical direction of the face regions $F_{11}$ and $F_{12}$ having the most frequent inclination $RF_i$.

Figure 8:
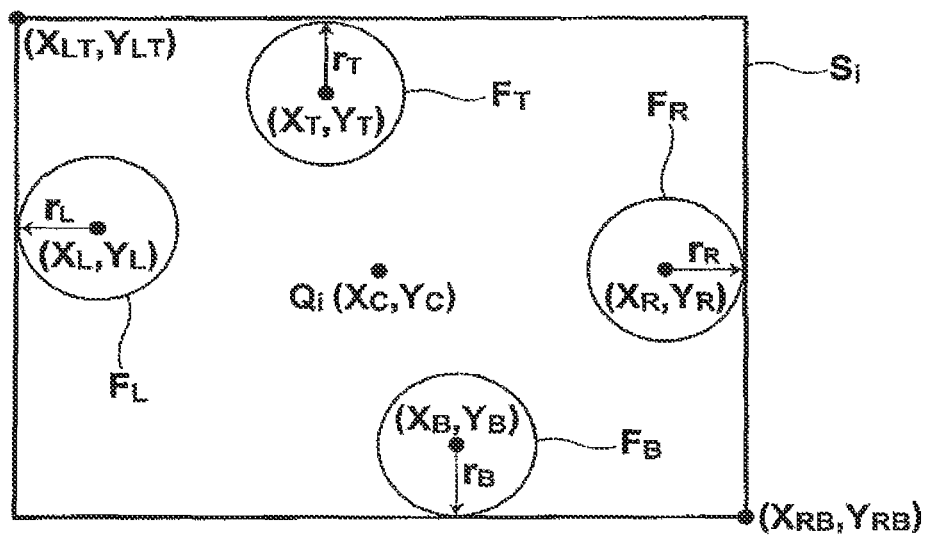
FIG. 8 is a diagram for explaining how a trimming reference area is determined.

The temporary trimming reference area determining unit 55 temporarily determines a rectangular area containing all the face regions $F_{ij}$ in the inputted image $P_i$ as a trimming reference area $S_i$. Specifically, as shown in FIG. 8, center coordinates ($X_T, Y_T$) and a radius $r_T$ of the topmost face region $F_T$, center coordinates ($X_R, Y_R$) and a radius $r_R$ of the rightmost face region $F_R$, center coordinates ($X_B, Y_B$) and a radius $r_B$ of the bottommost face region $F_B$, and center coordinates ($X_L, Y_L$) and a radius $r_L$ of the leftmost face region $F_L$ in the inputted image $P_i$ are found. Then, coordinates at the upper left corner ($X_{LT}, Y_{LT}$) and coordinates at the lower right corner ($X_{RB}, Y_{RB}$) of the rectangular area are found with adding a margin corresponding to the radius of each face according to equations (2) and (3) below:

$$(X_{LT}, Y_{LT}) = (X_L - r_L, Y_T + r_T) \tag{2},$$

$$(X_{RB}, Y_{RB}) = (X_R + r_R, Y_B - r_B) \tag{3}.$$

The temporary trimming reference point determining unit 56 temporarily determines center coordinates ($X_C, Y_C$) of the temporarily determined trimming reference area $S_i$ as a trimming reference point $Q_i$. In the specific example shown in FIG. 8, the center coordinates ($X_C, Y_C$) are found according to equations (4) and (5) below:

$$X_C = \{(X_L - r_L) + (X_R + r_R)\}/2 \tag{4},$$

$$Y_C = \{(Y_T - r_T) + (Y_B + r_B)\}/2 \tag{5}.$$

It should be noted that the reason for the "temporary determinations" made by the temporary trimming reference area determining unit 55 and the temporary trimming reference point determining unit 56 is that the rectangular area is rotated in a subsequent rotating operation, and the rotated rectangular area is used as the final trimming reference area.

Figure 9:
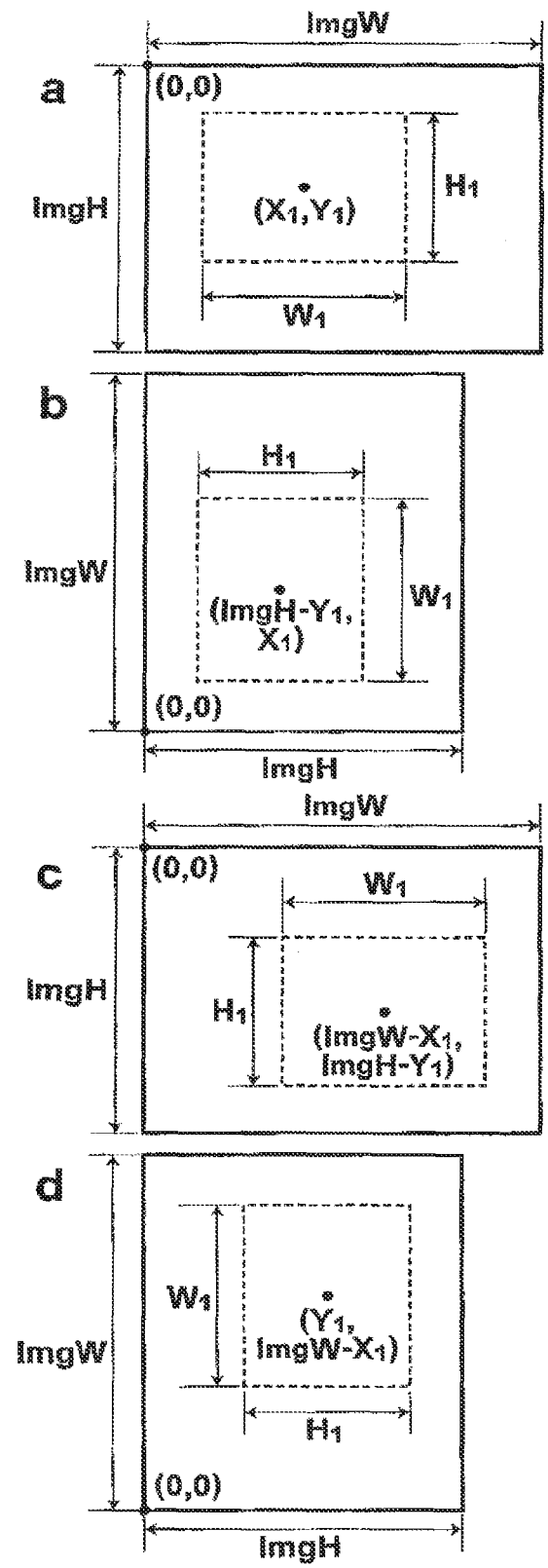
FIG. 9 is a diagram for explaining transformation of the trimming reference area and a trimming reference point along with rotation of an image.

The image rotating unit 57 rotates the inputted image $P_i$ depending on the inclination $R_i$. FIG. 9 illustrates at "a" to "d" cases (a)-(d) where the trimming reference area and the reference point are rotated correspondingly to (a) $R_i$=0 degree, (b) $R_i$=90 degrees, (c) $R_i$=180 degrees and (d) $R_i$=270 degrees, respectively. Assuming that the width of the inputted image is ImgW, the height of the inputted image is ImgH, the width of the trimming reference area $S_i$ before rotated is W1, the height of the trimming reference area $S_i$ before rotated is H1, the width of the rotated trimming reference area $S_i'$ is W, the height of the rotated trimming reference area $S_i'$ is H, and coordinates of a rotated trimming reference point $Q_i'$ is ($X_C'$, $Y_C'$), they can be found according to equations (6) to (21) below, respectively:

a. If $R_i$=0 degree, $$W=W1 \quad (6),$$

$$H=H1 \quad (7),$$

$$X_C'=X_1 \quad (8), \text{ and}$$

$$Y_C'=Y_1 \quad (9).$$

b. If $R_i$=90 degrees, $$W=H1 \quad (10),$$

$$H=W1 \quad (11),$$

$$X_C'=\text{Img}H-Y_1 \quad (12), \text{ and}$$

$$Y_C'=X_1 \quad (13).$$

b. If $R_i$=180 degrees, $$W=W1 \quad (14),$$

$$H=H1 \quad (15),$$

$$X_C'=\text{Img}W-X_1 \quad (16), \text{ and}$$

$$Y_C'=\text{Img}H-Y_1 \quad (17).$$

d. If $R_i$=270 degrees, $$W=H1 \quad (18),$$

$$H=W1 \quad (19),$$

$$X_C'=Y_1 \quad (20), \text{ and}$$

$$Y_C'=\text{Img}W-X_1 \quad (21).$$

In this manner, the final trimming reference area $S_i'$ and the final trimming reference point $Q_i'$ are determined.

Figure 14:
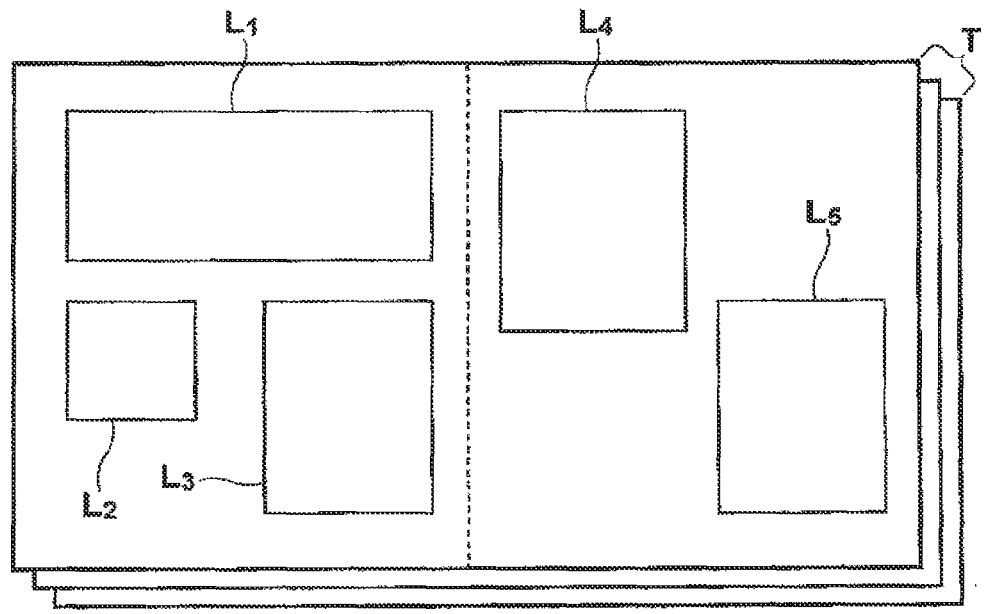
FIG. 14 illustrates an example of a photo album template (facing pages)

The template selection unit 58 receives selection by the user of a template T to be used for creating the photo album. Specifically, a user interface is provided, which displays on the display unit 6 a plurality of templates for creating a photo album, which have been stored in advance in the hard disk 24, and allows the user to select a desired template T by manipulating the input unit 18. FIG. 14 illustrates one example of the template T. As shown in the drawing, the template T contains a plurality of image insertion areas. Each image insertion area is associated with information $L_n$ representing the shape and the size of the outline (layout frame) of the area, and information $M_n$ (FIG. 4) representing the position of the center point of the area.

The image insertion area information acquiring unit 59 sequentially acquires the information $L_n$ representing the shape and the size of the outline (layout frame) and the information $M_n$ representing the position of the center point (layout reference point) of each image insertion area associated with the template T.

Figure 10:
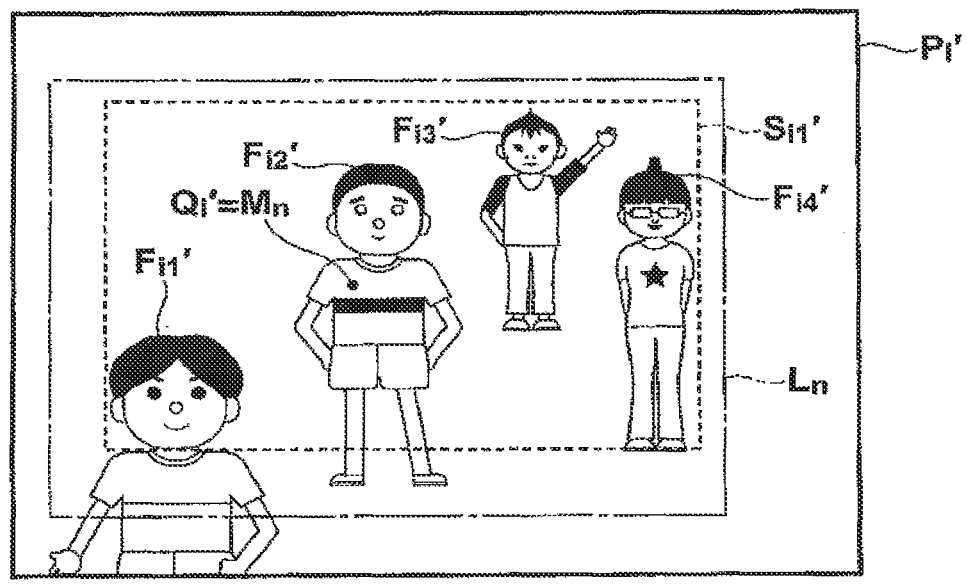
FIG. 10 is a diagram for explaining a trimming operation.

As shown in the example of FIG. 10, the trimming unit 60 sets within the inputted image $P_i'$ the layout frame $L_n$ of the image insertion area of the template T such that the layout reference point $M_n$ is positioned on the trimming reference point $Q_i'$ and the trimming reference area $S_i'$ is contained within the layout frame $L_n$, and clips an area $P_i''$ (FIG. 4) by trimming the inputted image $P_i'$ along the set layout frame. If the layout frame $L_n$ is smaller than the trimming reference area $S_i'$, the image $P_i'$ is reduced. In contrast, if the layout frame $L_n$ is larger than the trimming reference area $S_i'$, as shown in FIG. 10, peripheral areas around the trimming reference area $S_i'$ may also be trimmed away, or the inputted image $P_i'$ may be enlarged within the layout frame $L_n$. In the latter case, if the enlarged image $P_i'$ has an area outside the trimming reference area $S_i'$ and inside the layout frame $L_n$, the peripheral area around the trimming reference area $S_i'$ may be trimmed away.

The template composition unit 61 inserts the area $P_i''$ of each trimmed inputted image $P_i$ (i=1, 2, . . . , I) into corresponding one of the image insertion areas of the template T and combines them to create a photo album C (FIG. 4).

Figure 5:
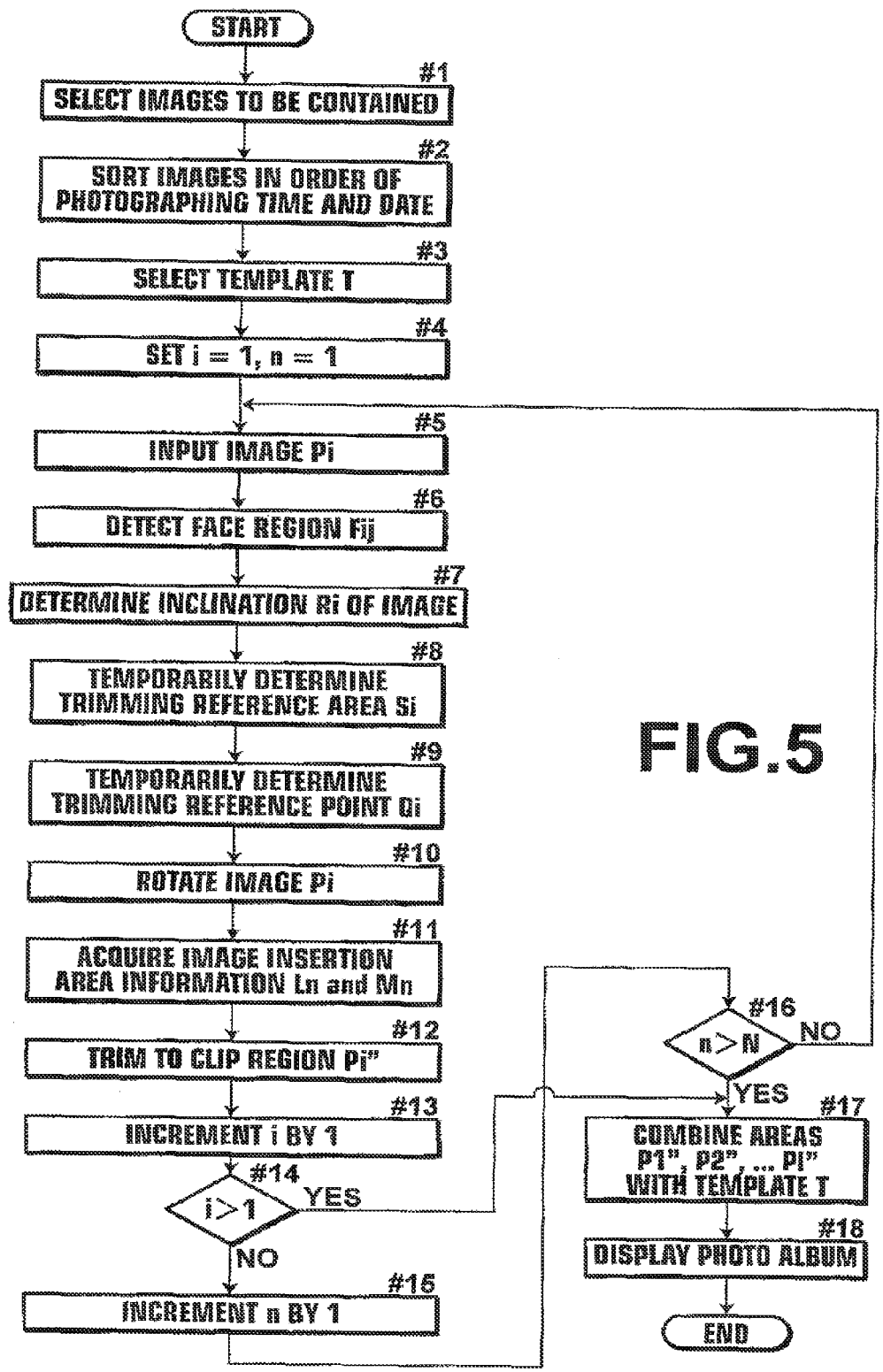
FIG. 5 is a flow chart illustrating operations in and the flow of a process in the first embodiment of the invention.

FIG. 5 is a flow chart illustrating the flow of a photo album creating process according to the first embodiment of the invention. As shown in the drawing, as the user selects the images $P_{i0}$ (i=1, 2, . . . , I) to be contained in the photo album via the image input unit 51 (#1), the image sorting unit 52 sorts the inputted images $P_{i0}$ (i=1, 2, . . . , I) in the order of photographing time and date (#2). The user selects the template T to be used for creating the photo album via the template selection unit 58 (#3). The suffix i for identifying the individual inputted image and the suffix n for identifying the individual image insertion area of the template T are initialized to 1 (#4). Then, the first image $P_i$ is read in (#5), and the face detection unit 53 detects the face region $F_{ij}$ (j=1, 2, . . . ) from the image $P_1$ (#6). The inclination detection unit 54 determines the inclination $R_1$ of the inputted image $P_1$ based on the inclination $RF1j$ of each face region $F_{ij}$ (#7). The temporary trimming reference area determining unit 55 temporarily determines the rectangular area (trimming reference area) $S_1$ containing all the face regions $F_{ij}$ in the inputted image $P_1$ (#8). The temporary trimming reference point determining unit 56 finds the center coordinates $Q_1$ of the rectangular area $S_1$ (#9). The image rotating unit 57 rotates the inputted image $P_1$ depending on the inclination $R_1$ (#10). The image insertion area information acquiring unit 59 acquires the information $L_1$ and the layout reference point $M_1$ of the layout frame of the first image insertion area (#11). The trimming unit 60 carries out trimming to clip the area $P_1''$ based on the rotated inputted image $P_1'$, the trimming reference area $S_1'$, the trimming reference point $Q_1'$, the layout frame L1 and the layout reference point $M_1$ (#12). The operations in the above described steps #5 to #12 are repeated (#14: NO, #16: NO) with incrementing the values of the suffixes i and n by one (#13, #15), until trimming (#12) of the last inputted image $P_I$ is completed (#14: YES) or acquisition (#11) of the last image insertion area information (n=N) is completed (#16: YES). Thereafter, the template composition unit 61 inserts the trimmed image $P_i''$ of each inputted image $P_i'$ into corresponding one of the image insertion areas of the template T and combines them to create the photo album C (#17). The created photo album is displayed on the display unit 6 (#18) to be checked by the user. It should be noted that the above described steps #7 to #9 may be carried out in the order of #8, #9 and #7, or step #7 and steps #8 to #9 may be carried out in parallel. Further, the template combining operation (#17) may be carried out when each inputted image has been trimmed (#12), i.e., immediately after step #12.

As described above, in the photo album creating device according to the first embodiment of the invention, the face detection unit 53 detects the at least one person's face region $F_{ij}$ from the inputted image $P_i$, the inclination determining unit 54 determines the inclination $R_i$ of the inputted image $P_i$ based on the inclination of each detected face region $F_{ij}$, the temporary trimming reference area determining unit 55 temporarily determines the trimming reference area $S_i$ containing all the detected face region (s) $F_{ij}$, the temporary trimming reference point determining unit 56 temporarily determines the trimming reference area $Q_i$, the image rotating unit 57 rotates the inputted image $P_i$ depending on the inclination $R_i$, the trimming unit 60 sets, within the inputted image $P_i'$, the layout frame $L_n$ of the image insertion area of the template T for the photo album such that the layout reference point $M_n$ is positioned on the trimming reference point $Q_i'$ and the trimming reference area $S_n'$ is contained within the layout frame $L_n$ and trims the inputted image $P_i'$ along the set layout frame. Therefore, even if the image to be combined $P_i'$ contains more than one persons and/or persons with various inclinations, the image can be automatically combined with the template in an appropriate manner without requiring the user to carry out any manual operations on the image to be combined $P_i$, thereby reducing troublesome manual operations by the user and allowing creation of a more appropriate photo album without a missing or inclined subject person.

Figure 11:
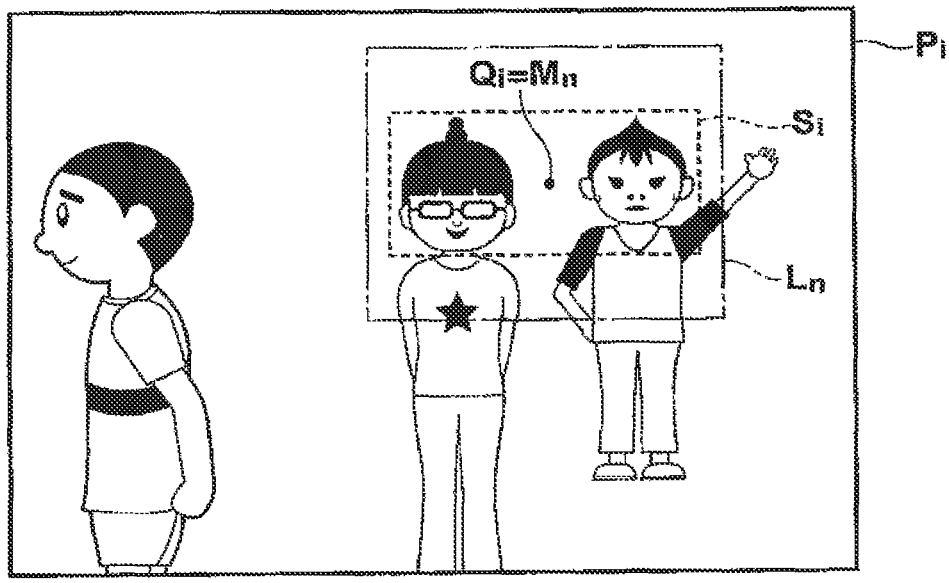
FIG. 11 is a diagram for explaining a trimming operation carried out only for main subjects.

In the above described embodiment, the face detection unit 53 may detect only a main subject (s) from the inputted image $P_i$. Specifically, a face region having an area larger than a predetermined threshold may be detected, classifiers obtained through machine learning which do not detect faces other than front-oriented faces may be used, or a face region having a degree of reliability, which indicates a probability of each detected region being the face (such as output values from the classifiers or a degree of similarity to a template representing a face), greater than a predetermined threshold may be detected. FIG. 11 is a diagram for explaining an effect of detecting the main subject only. As shown in the drawing, the face detection unit 53 in the above described embodiment may possibly detect not only the front-oriented faces of the two persons at the right of the image, but also the side-oriented face of the person at the left of the image. In such a case, the trimming reference area $S_i$ becomes a rectangular area (containing all the face regions) which is long in the transverse direction, and if the shape of the image insertion area (layout frame) $L_n$ is a near square, as shown in FIG. 11, the inputted image $P_i$ has to be significantly reduced to fit the trimming reference area $S_i$ within the layout frame $L_n$, and this will result in degradation of image quality. In contrast, in a case where only front-oriented faces are detected by face detection unit 53, as shown in FIG. 11, the shape of the trimming reference area $S_i$ becomes closer to square and a reduction ratio of the inputted image $P_i$ can be minimized to reduce degradation of image quality. Further, since the photo album containing only the main subjects is created, the created photo album can potentially reflect the taste of the user with a higher degree.

Further, the face detection unit 53 may detect all the face regions $F_{ij}$ from the inputted image $P_i$, and may include a main subject determining unit that determines a main subject (s) among the detected face regions $F_{ij}$. In this case, the temporary trimming reference area determining unit 55 determines a trimming reference area containing only the main subject(s), in the similar manner as described above.

Figure 12:
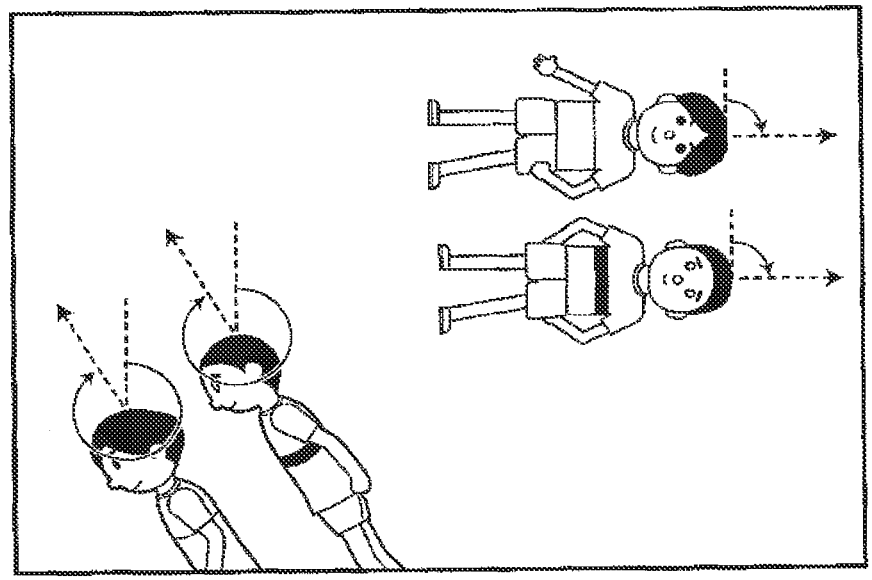
FIG. 12 is a diagram for explaining determination of the inclination of the image with focusing on the main subjects.

The inclination determining unit 54 may determine the inclination of the inputted image with weighting the inclinations of the detected face regions such that a larger weight is assigned to the inclination of the main subject. For example, for the inputted image shown in FIG. 12, larger weights may be assigned to the inclinations of the front-oriented faces at the right of the image than weights assigned to the inclinations of the side-oriented faces at the left of the image to determine the inclination of the inputted image that reflects the inclinations of the front-oriented faces with a higher degree. In this case, if the value of the weights assigned to the inclinations of the side-oriented faces is set to 0, the same effect as detecting only the main subject can be obtained.

In the above described embodiment, the photo album is created by sequentially inserting the inputted images $P_i'$, which have been sorted in the order of photographing time and date, in the image insertion areas of the template T from the first one. However, if the shape (aspect ratio) of the trimming reference area $S_i'$ in the inputted image $P_i'$ largely differs from the shape (aspect ratio) of the image insertion area (layout frame $L_n$), the inputted image $P_i'$ have to be significantly reduced to fit the trimming reference area $S_i'$ within the layout frame $L_n$, and this will result in degradation of image quality. If the inputted image $P_i'$ is not reduced, the trimming reference area $S_i'$ cannot be completely contained in the layout frame $L_n$, and the trimmed area $P_i''$ does not contain all the face regions in the inputted image $P_i'$. Therefore, each image insertion area (layout frame $L_n$) of the template T may be associated with an aspect ratio $A_n$ of the area, and the image insertion area information acquiring unit 59 may calculate an aspect ratio $A_i$ of the trimming reference area $S_i'$ to select an appropriate image insertion area such that a difference between the aspect ratio of the trimming reference area and the aspect ratio of the image insertion area is smaller than a predetermined threshold. In this manner, a scaling ratio for enlarging or reducing the inputted image $P_i'$ to tailor the inputted image $P_i'$ to the aspect ratio $A_n$ of the layout frame $L_n$ can be minimized, thereby reducing degradation of image quality of the combined image. In addition, since the peripheral areas around the trimming reference area $S_i'$ contained in the layout frame $L_n$ is minimized, the subject person contained in the combined image has a more appropriate size, and this is more desirable for the user.

Figure 13:
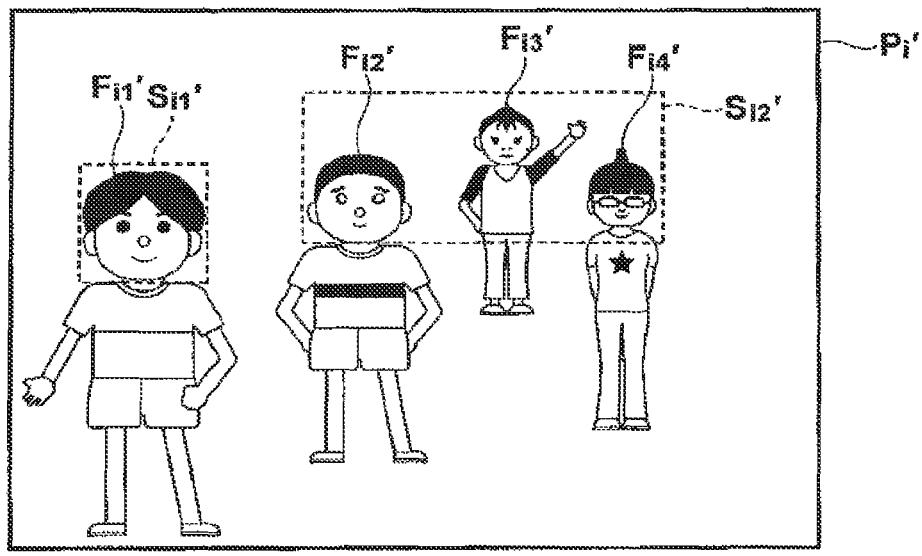
FIG. 13 illustrates an example where the trimming reference area is divided.

If there is no image insertion area having an aspect ratio that makes the difference between the aspect ratios smaller than the predetermined threshold, then, more than one trimming reference areas $S_{i1}'$, $S_{i2}'$ may be set in the single inputted image $P_i'$, as shown in the example of FIG. 13. Then, the image insertion area information acquiring unit 59 may select, for each area $S_{i1}'$, $S_{i2}'$, an image insertion area having an aspect ratio that makes the difference between the aspect ratios smaller than the predetermined threshold. In this case, since the areas $S_{i1}'$ and $S_{i2}'$ are obtained from the single inputted image $P_i'$, it is preferred that the areas $S_{i1}'$ and $S_{i2}'$ are inserted at adjacent positions in the template T, in view of content characteristics of the image. Therefore, for the trimming reference areas $S_{i1}'$, $S_{i2}'$ obtained from the single inputted image $P_i'$ in this manner, the image insertion area information acquiring unit 59 preferably selects most appropriate image insertion areas from the image insertion areas in facing pages (image insertion areas corresponding to the layout frames $L_1$ to $L_5$ shown in FIG. 14) of the template. In the example of FIG. 13, the layout frame $L_2$ is selected for the trimming reference area $S_{i1}'$ and the layout frame $L_1$ is selected for the trimming reference area $S_{i2}'$.

It should be noted that, in the case where more than one trimming reference areas are set in the single inputted image $P_i'$, a distance between the adjacent face regions may be calculated, and if the calculated distance is larger than a predetermined threshold, more than one trimming reference areas may be determined such that a boundary is formed between the adjacent face regions. The example shown in FIG. 13 illustrates a case where the distance between the face regions $F_{i1}'$ and $F_{i2}'$ in the inputted image $P_i'$ is larger than the predetermined threshold.

Figure 15:
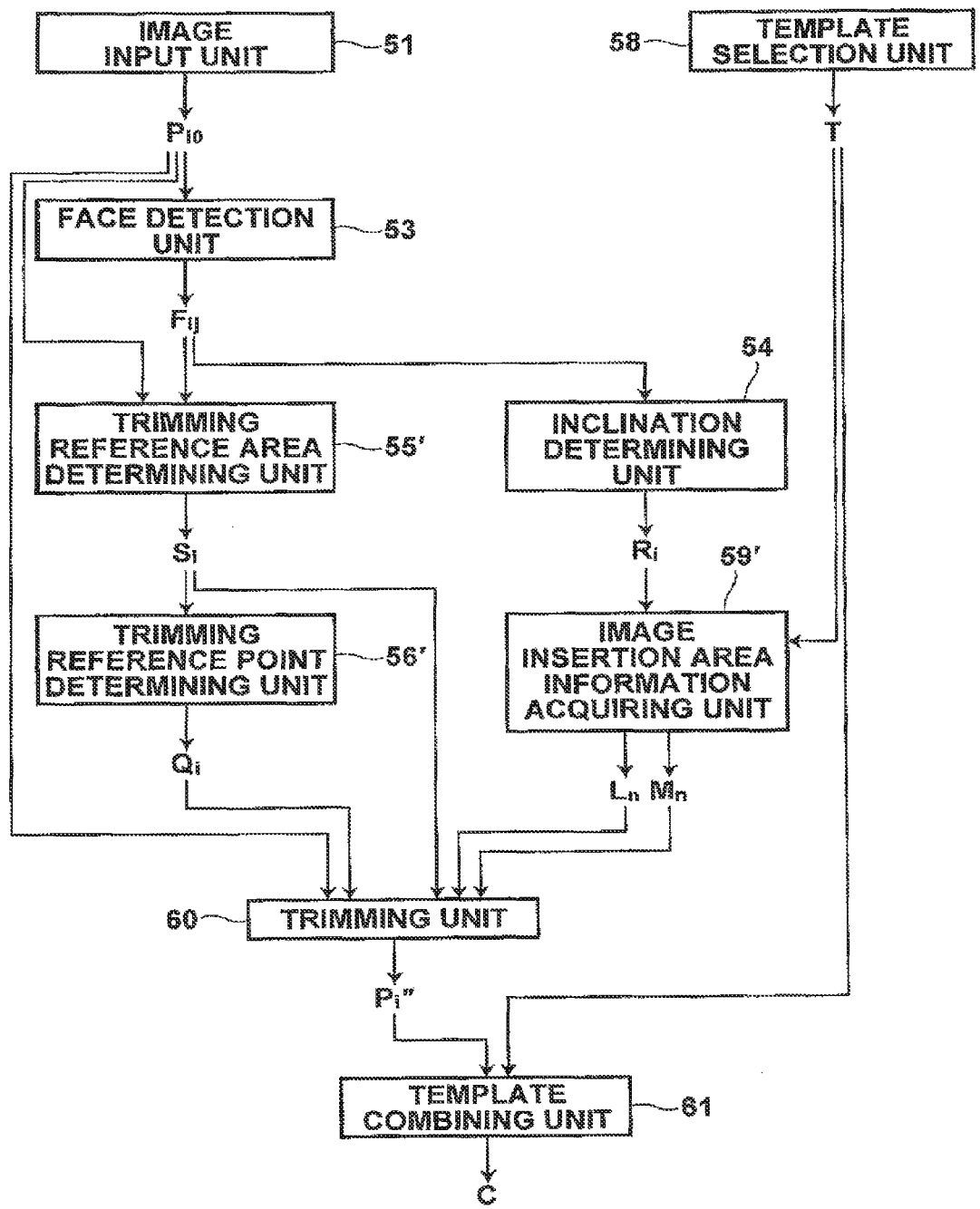
FIG. 15 is a block diagram schematically illustrating the configuration of and data flow in a photo album creating device according to a second embodiment of the invention.

A second embodiment of the invention is to combine the inputted images $P_i$ with a template in a more appropriate manner without rotating the inputted images $P_i$, with taking the inclinations of the inputted images $P_i$ into account. FIG. 15 is a block diagram illustrating the configuration of a photo album creating device according to the second embodiment of the invention. The photo album creating device of the second embodiment differs from the device of the first embodiment in the following points.

Firstly, the image sorting unit 52 and the image rotating unit 57 are not included.

Secondly, each image insertion area of the template T is associated with a preferred inclination of an image to be inserted therein.

Thirdly, the image insertion area information acquiring unit 59 is substituted with an image insertion area information acquiring unit 59'. The image insertion area information acquiring unit 59' selects information of an image insertion area associated with an inclination that corresponds to the inclination $R_i$ of each inputted image $P_i$.

The temporary trimming reference area determining unit 55 is substituted with a trimming reference area determining unit 55' and the temporary trimming reference point determining unit 56 is substituted with a trimming reference point determining unit 56'. However, this is merely a change of element names, and these elements carry out the same operations as those described in the first embodiment, except that the trimming reference area and the trimming reference point determined by these elements are the final trimming reference area and the final trimming reference point since the inputted images $P_i$ are not rotated.

The flow of the photo album creating process carried out by the photo album creating device of this embodiment is the same as the process of the flow chart shown in FIG. 5, except that the operation in step #10 is omitted and the image insertion area information acquiring unit 59' carries out the operation of step #11. The suffix n here refers to the n-th image insertion area information selected by the image insertion area information acquiring unit 59'.

As described above, according to the photo album creating device of the second embodiment of the invention, the image insertion area information acquiring unit 59' selects an image insertion area that corresponds to the inclination $R_i$ of each inputted image $P_i$ determined by the inclination determining unit 54. Therefore, troublesome manual operations by the user can be reduced as with the first embodiment, and a more desirable photo album free of uncomfortable impression due to inclined subjects in the inputted images $P_i$ can be created.

It should be understood that various changes and modifications made to the system configuration, process flow, user interface, and the like, disclosed in the above embodiments without departing from the scope and spirit of the invention are also intended to be encompassed within the technical scope of the present invention. The above-described embodiments are given only by way of examples, and should not be construed to limit the technical scope of the present invention.

According to the present invention, at least one person's face region is detected from an inputted image, the inclination of each person is calculated based on content characteristics of the person, the inclination of the inputted image is determined based on the inclination of each person, the trimming reference area containing one or more of the at least one detected face region is determined in the inputted image, and trimming of the inputted image and composition with the photo album template are carried out using these information such that the image inserted into each image insertion area of the photo album template has an inclination that corresponds to an inclination of an image supposed to be inserted into the image insertion area and the trimming reference area is contained in the image insertion area. Therefore, even if an image to be combined contains more than one persons and/or persons with various inclinations, the image can be automatically combined with the template in an appropriate manner without requiring the user to carry out any manual operations on the image to be combined, thereby reducing troublesome manual operations by the user and allowing creation of a more appropriate photo album without a missing or inclined subject person.

In a case where a person's face of the main subject in the inputted image is detected or the main subject is determined among the persons detected by the face detection operation, and the inclination of the inputted image and the trimming reference area are determined based on the detected main subject, influence of persons other than the main subject in the inputted image can be reduced in determination of the inclination of the inputted image and the trimming reference area, and a more appropriate photo album that reflects the taste of the user with a higher degree can be created.

In a case where the photo album template includes more than one image insertion areas, the trimming may be carried out when the aspect ratio of the layout frame and the aspect ratio of the trimming reference area (rectangular area) are similar enough to each other to satisfy a predetermined criterion. This minimizes a scaling ratio for enlarging or reducing the inputted image to tailor the inputted image to the aspect ratio of the layout frame, thereby reducing degradation of image quality of the combined image. In addition, since the peripheral areas around the trimming reference area contained in the layout frame is minimized, the subject person contained in the combined image has a more appropriate size, and this is more desirable for the user.

What is claimed is:

1. A photo album creating device comprising:
a face detection unit to detect at least one person's face region from an inputted image;
an inclination determining unit to calculate an inclination of each of the at least one person based on content characteristics of the person and to determine an inclination of the inputted image based on the calculated inclination;
a trimming reference area determining unit to determine a trimming reference area in the inputted image, the trimming reference area containing one or more of the at least one face region detected by the face detection unit;
a trimming reference point determining unit to determine a trimming reference point in the trimming reference area;
a template for the photo album associated with at least one image insertion area for receiving an inserted image, a layout reference point arbitrarily set in each image insertion area, and inclination information representing an inclination of an image supposed to be inserted into each image insertion area, the template including at least one layout frame, each layout frame representing an outline of each image insertion area;

an image insertion area determining unit to compare the inclination of the inputted image determined by the inclination determining unit with the inclination information to determine, from the template, one of the at least one image insertion area corresponding to the inclination of the inputted image;

a trimming unit to set in the inputted image the layout frame representing the outline of the determined image insertion area and trim the inputted image along the set layout frame, wherein the layout frame is set such that the layout reference point is positioned on the trimming reference point and the trimming reference area is contained in the layout frame;

a template composition unit to combine an area of the trimmed inputted image with the template; and further comprising a main subject determining unit to determine a main subject from the at least one person detected by the face detection unit based on content characteristics of the at least one person, wherein the inclination determining unit weights the inclination of each of the at least one person such that a larger weight is assigned to the inclination of the main subject to determine the inclination of the inputted image.

2. The photo album creating device as claimed in claim 1, wherein the face detection unit detects a person's face of a main subject in the inputted image.

3. The photo album creating device as claimed in claim 1, wherein the trimming reference area determined by the trimming reference area determining unit in the inputted image contains all of the at least one face region detected by the face detection unit.

4. The photo album creating device as claimed in claim 1 further comprising a main subject determining unit to determine a main subject from the at least one person detected by the face detection unit based on content characteristics of the at least one person, wherein the trimming reference area determined by the trimming reference area unit contains only the main subject.

5. The photo album creating device as claimed in claim 1, wherein:

the trimming reference area comprises a rectangular area;
the at least one image insertion area of the template comprises a plurality of image insertion areas; and
the trimming unit carries out the trimming when an aspect ratio of the layout frame and an aspect ratio of the trimming reference area are similar enough to each other to satisfy a predetermined criterion.

6. The photo album creating device as claimed in claim 1, wherein:

the trimming reference area comprises a rectangular area;
the at least one image insertion area of the template comprises a plurality of image insertion areas; and
when an aspect ratio of the layout frame and an aspect ratio of the trimming reference area are not similar enough to each other to satisfy a predetermined criterion, the trimming unit determines a main subject from the at least one person detected by the face detection unit based on content characteristics of the at least one person, and carries out the trimming using the trimming reference area determined to contain only the main subject.

7. The photo album creating device as claimed in claim 1, wherein:

the trimming reference area comprises a rectangular area;
the at least one image insertion area of the template comprises a plurality of image insertion areas; and
when an aspect ratio of the layout frame and an aspect ratio of the trimming reference area are not similar enough to each other to satisfy a predetermined criterion, the trimming unit divides the trimming reference area into a plurality of smaller areas, and carries out the trimming for each of the smaller areas with using layout frames of the plurality of image insertion areas on facing pages of the photo album.

8. The photo album creating device as claimed in claim 1, wherein the trimming reference area determining unit calculates a distance between the face regions adjacent to each other, and if the calculated distance is larger than a predetermined threshold, the trimming reference area determining unit determines a plurality of trimming reference areas having a boundary between the adjacent face regions.

9. A photo album creating method comprising:

obtaining a template for the photo album associated with at least one image insertion area for receiving an inserted image, a layout reference point arbitrarily set in each image insertion area, and inclination information representing an inclination of an image supposed to be inserted into each image insertion area, the template including at least one layout frame, each layout frame representing an outline of each image insertion area;

detecting at least one person's face region from an inputted image;

calculating an inclination of each of the at least one person based on content characteristics of the person and determining an inclination of the inputted image based on the calculated inclination;

determining a trimming reference area in the inputted image, the trimming reference area containing one or more of the at least one detected face region;

determining a trimming reference point in the trimming reference area;

comparing the inclination of the inputted image with the inclination information to determine, from the template, one of the at least one image insertion area corresponding to the inclination of the inputted image;

setting, in the inputted image, the layout frame representing the outline of the determined image insertion area and trimming the inputted image along the set layout frame, wherein the layout frame is set such that the layout reference point is positioned on the trimming reference point and the trimming reference area is contained in the layout frame;

combining an area of the trimmed inputted image with the template; and further comprising determining a main subject from the at least one person detected by the face detection based on content characteristics of the at least one person, wherein the inclination determining further includes weighting the inclination of each of the at least one person such that a larger weight is assigned to the inclination of the main subject to determine the inclination of the inputted image.

* * * * *